(12) United States Patent
Newman et al.

(10) Patent No.: US 9,135,419 B2
(45) Date of Patent: Sep. 15, 2015

(54) ENVIRONMENTAL ADJUSTMENTS USING BIOMETRICS

(75) Inventors: Kurt D. Newman, Matthews, NC (US); David Joa, Irvine, CA (US); Debashis Ghosh, Charlotte, NC (US); Timothy J. Bendel, Charlotte, NC (US); Mark V. Krein, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 694 days.

(21) Appl. No.: 12/697,751

(22) Filed: Feb. 1, 2010

(65) Prior Publication Data

US 2011/0187500 A1    Aug. 4, 2011

(51) Int. Cl.
*G06F 21/32* (2013.01)
*G06Q 20/40* (2012.01)

(52) U.S. Cl.
CPC .......... *G06F 21/32* (2013.01); *G06Q 20/40145* (2013.01)

(58) Field of Classification Search
CPC .......... G06K 9/00006; G06K 9/00013; G06K 9/00885; G06K 2009/00932; G06F 21/32; G07C 9/00158; G07C 9/00087; G06Q 20/40145
USPC .......... 340/5.51–5.53, 5.81–5.85; 726/27–28, 726/35; 382/117, 124–127
See application file for complete search history.

(56) References Cited

U.S. PATENT DOCUMENTS

| | | | | |
|---|---|---|---|---|
| 5,920,642 A * | 7/1999 | Merjanian | ...................... | 382/126 |
| 7,068,145 B2 * | 6/2006 | Reitmeier | ..................... | 340/5.53 |
| 7,170,400 B2 * | 1/2007 | Cowelchuk et al. | .......... | 340/438 |
| 7,298,871 B2 * | 11/2007 | Lee et al. | ...................... | 382/115 |
| 7,366,498 B2 * | 4/2008 | Ko et al. | ....................... | 455/411 |
| 7,575,322 B2 | 8/2009 | Somani | | |
| 2003/0227439 A1 * | 12/2003 | Lee et al. | ...................... | 345/156 |
| 2006/0072791 A1 * | 4/2006 | Gutta et al. | ................... | 382/115 |
| 2006/0250213 A1 * | 11/2006 | Cain et al. | ..................... | 340/5.52 |
| 2007/0207789 A1 * | 9/2007 | Zellner et al. | ................. | 455/415 |
| 2007/0280515 A1 * | 12/2007 | Goto | ............................ | 382/124 |
| 2008/0317292 A1 * | 12/2008 | Baker et al. | ................... | 382/115 |
| 2009/0146779 A1 * | 6/2009 | Kumar et al. | ................ | 340/5.31 |

* cited by examiner

*Primary Examiner* — Firmin Backer
*Assistant Examiner* — Nay Tun
(74) *Attorney, Agent, or Firm* — Banner & Witcoff, Ltd.; Michael A. Springs (57) ABSTRACT

Systems and methods for environmental adjustments using biometrics are described. A scanned biometric parameter of an individual may be received and a determination may be made as to whether the scanned biometric parameter of the individual matches a stored biometric parameter of a plurality of stored biometric parameters. Biometric parameters include retinal images, DNA, and voice samples. If a match exists, the individual may be identified based upon the stored biometric parameter. At least one adjustment to change on at least one device based upon the identified individual may be determined. The at least one device may be configured for modifying an environmental condition of the identified individual. At least one instruction to implement the determined at least one adjustment may be transmitted. The adjustment may be a physical adjustment to the device, such as the height level of a chair.

13 Claims, 5 Drawing Sheets

ENVIRONMENTAL ADJUSTMENTS USING BIOMETRICS

BACKGROUND

Biometrics such as retinal scanning, voice, DNA, and the like, are widely used to enable access control and identification matches. An individual's retina may be scanned to specifically identify the individual. In such a case, access to a vault or other area may be gained when an individual is authenticated to have proper access.

In addition, general physical aspects for an individual may be measured for performing a change to a system. Systems for measuring an individual's weight and making appropriate changes exist; however, such systems are not linked to a specific individual. Any individual of the particular characteristic of weight, height, and the like will be treated exactly the same way.

SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the present disclosure are directed to a method and system for a new environmental adjustment system using biometrics. A scanned biometric parameter of an individual may be received and a determination may be made as to whether the scanned biometric parameter of the individual matches a stored biometric parameter of a plurality of stored biometric parameters. Biometric parameters include retinal images, DNA, and voice samples. If a match exists, the individual may be identified based upon the stored biometric parameter. At least one adjustment to change on at least one device based upon the identified individual may be determined. The at least one device may be configured for modifying an environmental condition of the identified individual. At least one instruction to implement the determined at least one adjustment may be transmitted. The adjustment may be a physical adjustment to the device, such as the height level of a chair.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

A more complete understanding of aspects of the present disclosure and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments in which the disclosure may be practiced. It is to be understood that other embodiments may be utilized and structural and functional modifications may be made.

Figure 1:
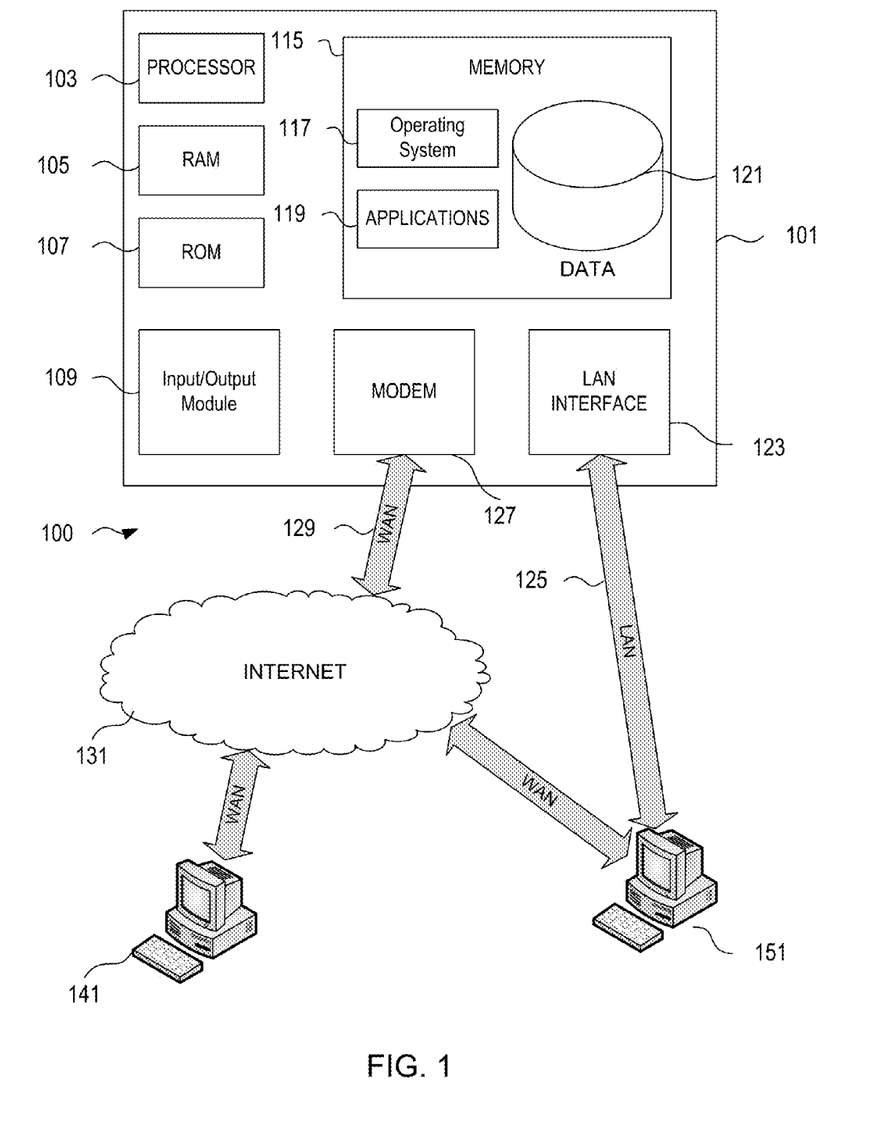
FIG. 1 illustrates a schematic diagram of a general-purpose digital computing environment in which certain aspects of the present disclosure may be implemented.

FIG. 1 illustrates a block diagram of a generic computing device 101 (e.g., a computer server) that may be used according to an illustrative embodiment of the disclosure. The computer server 101 may have a processor 103 for controlling overall operation of the server and its associated components, including RAM 105, ROM 107, input/output module 109, and memory 115.

Input/Output (I/O) 109 may include a microphone, keypad, touch screen, camera, and/or stylus through which a user of device 101 may provide input, and may also include one or more of a speaker for providing audio output and a video display device for providing textual, audiovisual and/or graphical output. Other I/O devices through which a user and/or other device may provide input to device 101 also may be included. Software may be stored within memory 115 and/or storage to provide instructions to processor 103 for enabling server 101 to perform various functions. For example, memory 115 may store software used by the server 101, such as an operating system 117, application programs 119, and an associated database 121. Alternatively, some or all of server 101 computer executable instructions may be embodied in hardware or firmware (not shown). As described in detail below, the database 121 may provide centralized storage of characteristics associated with individuals, allowing interoperability between different elements of the business residing at different physical locations.

The server 101 may operate in a networked environment supporting connections to one or more remote computers, such as terminals 141 and 151. The terminals 141 and 151 may be personal computers or servers that include many or all of the elements described above relative to the server 101. The network connections depicted in FIG. 1 include a local area network (LAN) 125 and a wide area network (WAN) 129, but may also include other networks. When used in a LAN networking environment, the computer 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed.

Additionally, an application program 119 used by the server 101 according to an illustrative embodiment of the disclosure may include computer executable instructions for invoking functionality related to providing access authorization for facilities and networks.

Computing device 101 and/or terminals 141 or 151 may also be mobile terminals including various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by a computer. Generally, program modules include routines, programs, objects, components, data structures, and the like that perform particular tasks or implement particular abstract data types. The disclosure may also be practiced in distributed computing environments where tasks are performed by remote processing devices that are linked through a communications network. In a distributed computing environment, program modules may be located in both local and remote computer storage media including memory storage devices.

Figure 2:
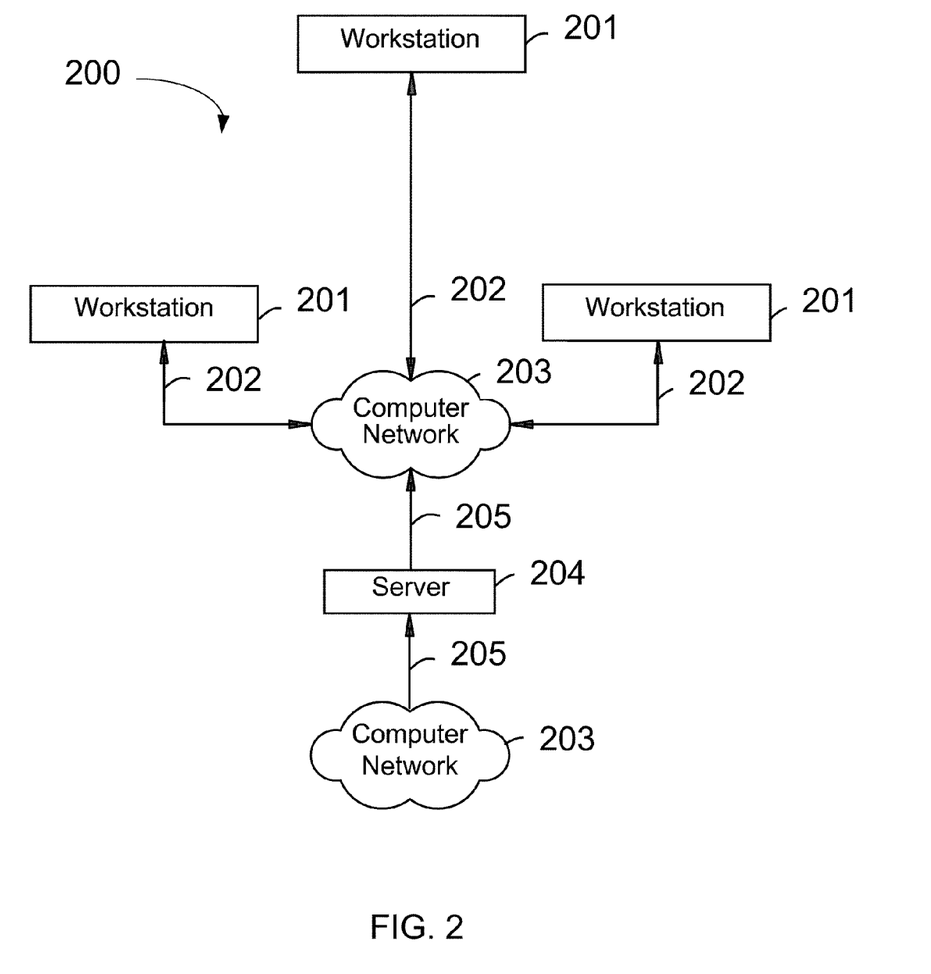
FIG. 2 is an illustrative block diagram of workstations and servers that may be used to implement the processes and functions of certain embodiments of the present disclosure.

Referring to FIG. 2, an illustrative system 200 for implementing methods according to the present disclosure is shown. As illustrated, system 200 may include one or more workstations 201. Workstations 201 may be local or remote, and are connected by one or more communications links 202 to computer network 203 that is linked via communications links 205 to server 204. In system 200, server 204 may be any suitable server, processor, computer, or data processing device, or combination of the same.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, and the like.

The steps that follow in the Figures may be implemented by one or more of the components in FIGS. 1 and 2 and/or other components, including other computing devices.

Figure 3:
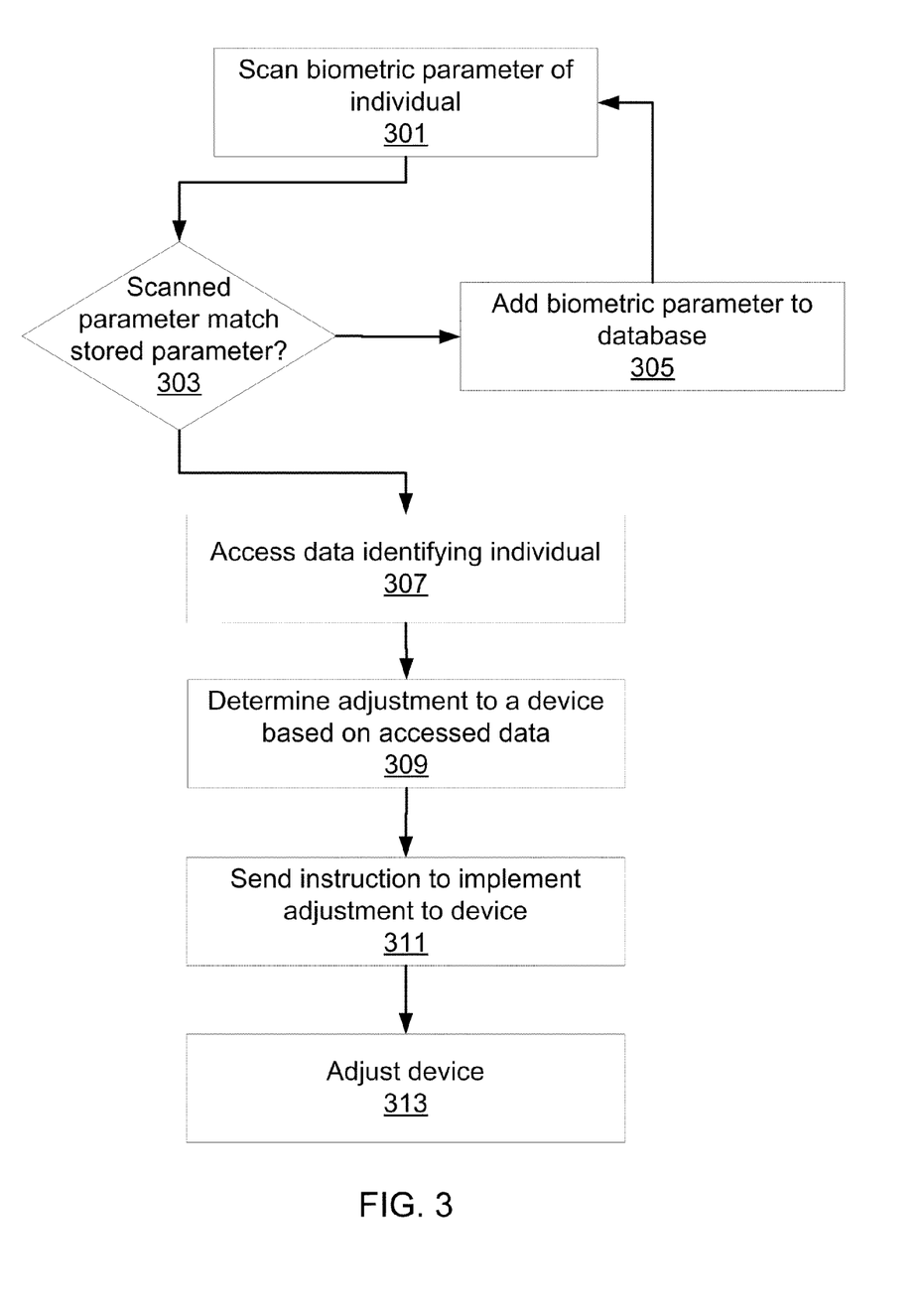
FIG. 3 is a flowchart of an illustrative method for environmental adjustments based upon biometrics in accordance with at least one aspect of the present disclosure.

FIG. 3 is a flowchart of an illustrative method for environmental adjustments based upon biometrics in accordance with at least one aspect of the present disclosure. In step 301, a biometric parameter of an individual may be scanned by a biometric scanner. This biometric parameter may include a host of biomarkers such as the iris, retina, fingerprints, voice, and/or face recognition. In step 303, this scanned biometric parameter may be compared to biometric parameters stored in a database. This database may be populated with any one of or all of the different varieties of biometric parameters. It also may be located either with the biometric scanner or remotely from such a scanner. If the parameter scanned does not match any of the parameters already in the database, the parameter may be added to the database in step 305, such as in the case of a first time user, and then the process may go back to step 301. If the parameter is matched, data of the individual may be accessed based on the parameter in step 307. Such data may include one or more preferences, of the identified individual, for environmental conditions associated with one or more devices. Examples of preferences may include height of an adjustable chair, height of a podium, temperature of an environment, angle of chair, and the like.

The process moves to step 309 where one or more adjustments to change on one or more devices may be determined. The one or more devices are configured for modifying an environmental condition of the identified individual. The determination in 309 may be based upon the accessed data of the identified individual that includes preferences associated with the one or more devices. Proceeding to 311, an instruction to implement the one or more adjustments based upon the identified individual may be transmitted. Such a transmission may be to the one or more devices that are to be adjusted. In 313, the one or more devices are adjusted in accordance with the instruction transmitted in 311.

As an example, consider a situation where a customer of a financial entity enters the financial entity to make a deposit of funds into an account of the customer. In such a situation, the customer may want to speak with a worker behind a service counter. As the customer approaches, a biometric parameter of the customer may be scanned. For example, a retinal image of the customer may be captured. The system may match the scanned retinal image with a previously stored image of the customer. In one example, the customer may be handicapped and confined to a wheelchair. In such an example, when the customer approaches the service counter, the worker may have to make special arrangements to interact with the customer. By utilizing one or more aspects of the present disclosure described herein, a platform beneath the customer may raise the customer a predefined distance. Alternatively or concurrently, a platform beneath the worker and/or beneath the service counter may be lowered to allow for better line of sight between the worker and the customer. In another example, a device for swiping a debit card associated with the financial entity and/or entering a personal identification number (PIN) may be lowered to accommodate the identified individual. Any of a number of different devices may be adjusted to change an environmental condition for the customer.

Any of a number of environmental conditions may be adjusted in response to identification of a specific individual in accordance with one or more aspects of the present disclosure. In one example, an individual may be ready to use a shower. Having identified the individual by a biometric parameter of the individual being scanned, a preference of the individual may be applied to the force of water outputted, a particular type of output of the water (such as an overhead nozzle, a hard spray, a wide spray pattern, and the like), and setting for hand rails and/or a seat, and/or a temperature of the water being outputted. As such, when the identified individual enters the shower, the preferred settings for one or more of these environmental conditions may be implemented automatically without manual input by the individual.

Figure 4:
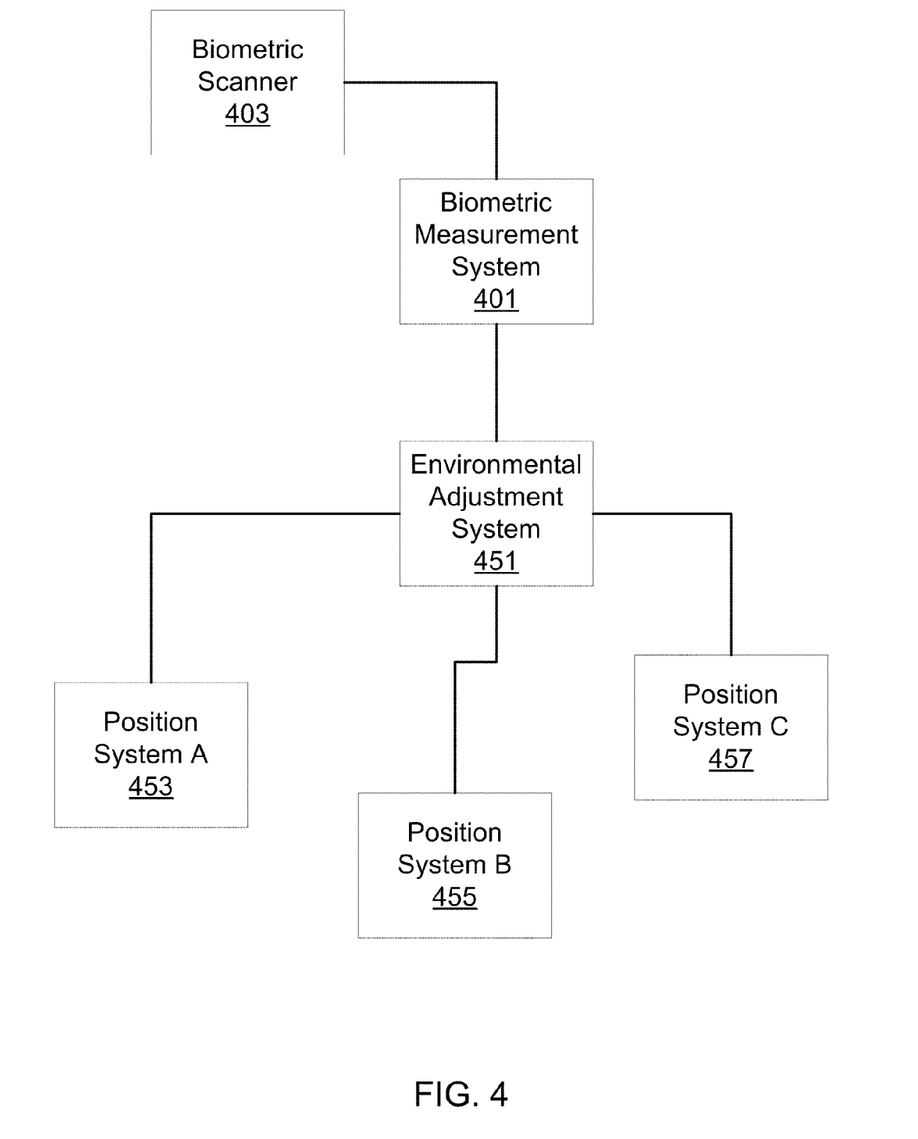
FIG. 4 is an illustrative schematic diagram of an environmental adjustment system using biometrics in accordance with at least one aspect of the present disclosure.

FIG. 4 is an illustrative schematic diagram of an environmental adjustment system using biometrics in accordance with at least one aspect of the present disclosure. FIG. 4 includes a biometric scanner 403. Biometric scanner 403 scans a biometric parameter of an individual for specific identification of the individual. Any of a number of different types of biometric scanning technologies may be utilized. Voice capture systems, DNA capture systems, and retinal scanning systems are but a few examples. As used herein, a biometric parameter is utilized for identification of the particular individual associated with the scanned biometric parameter as described in more detail below. Although shown as only one biometric scanner 401, one or more additional biometric scanners may be included for measurement of the same and/or other biometric parameters. For example, should a desire exist to have two retinal biometric scanners 403 and one voice biometric scanner 403, such a system may be utilized with the biometric measurement system 401 described herein.

Operatively connected to the biometric scanner 403 is a biometric measurement system 401. Biometric measurement system 401 takes the scanned data from the biometric scanner 403 to identify the individual scanned by the biometric scanner. Biometric measurement system 401 may be configured to determine whether a scanned biometric parameter matches a stored biometric parameter. Biometric measurement system 401 may include an internal and/or external database that includes a plurality of different biometric parameters for a plurality of different individuals. Biometric measurement system 401 may access such a database to determine whether the individual may be identified.

If the scanned biometric parameter matches a stored biometric parameter, the biometric measurement system 401 may identify the individual. In an example of a first encounter with the system where an individual has not yet provided any biometric parameters for storage in a database, the individual may provide any of a number of different biometric parameters for association in the database with that particular individual and eventual identification of the individual in future uses of the system. The individual may provide a plurality of biometric parameters, such as a voice sample and a retinal scan for recursive identification checks and/or back-up systems should one type of biometric scanner 403 fail during operation. Having matched a scanned biometric parameter with a stored biometric parameter, the individual that was scanned may be identified. With the identification of the individual, one or more environmental conditions associated with the individual may be changed in response.

Operatively connected to the biometric measurement system 401 is an environmental adjustment system 451. Environmental adjustment system 451 may receive one or more instructions from the biometric measurement system 401 to implement at least one physical adjustment to a device. The one or more instructions for implementing at least one physical adjustment to the device are based upon the identified individual. Biometric measurement system 401 may be configured to send the one or more instructions as a wireless connection, as a wired connection, or as a combination of the two connections. As the device is configured for physical contact with the individual, the individual gains a personalized environmental condition with respect to the device.

Environmental adjustment system 451 receives the one or more instructions and implements one or more physical adjustments to one or more devices in response. Because the one or more instructions are based upon the identified individual, each particular individual has his or her specific environmental conditions implemented. Biometric measurement system 401 and/or environmental adjustment system 451 may be configured to determine one or more physical adjustments to change on one or more devices. The one or more devices may be configured for modifying an environmental condition of the identified individual. Examples of a device may be a chair, a platform beneath an individual, a desk, a podium, a combination of a chair, an accelerator, and a brake, and other devices. A device modifies one or more environmental conditions of an individual. For example, if the device is a platform beneath the individual, the platform could be lowered or raised with respect to a desk for modifying the line of sight of the individual.

Operatively connected to the environmental adjustment system 451 are shown a plurality of position systems; position system A 453, position system B 455, and position system C 457. The illustrative example of FIG. 4 includes three position systems but any of a number of position systems may be utilized. Position systems A 451, B 455, and/or C 457 may be included as part of a single device being adjusted. In the example of a platform beneath an individual, position system A 453 may be included within the control of the platform for adjusting the height of the platform. Based upon the identified individual, one or more environmental conditions of an individual may be modified by the position systems A 453, B 455, and/or C 457.

In one example, position system A 453 may be the accelerator and brake pedals of a car. Position system B 455 may be the chair of the car that an individual sits in for operation, and position system C 457 may be the rear view mirror of the car. Having identified the individual utilizing the car, the accelerator and brake pedals positions may be modified in response by position system A 453 to place the pedals further from a default location with respect to the chair as the identified individual may be a very tall individual. The chair of the car with respect to the steering wheel of the car may be modified in response by position system B 455 to place the chair further away from the steering wheel as the identified individual may be a very tall individual, and the rear view mirror position and/or angle may be modified in response by the position system C 457 to account for the desired line of sight of the identified individual.

Figure 5:
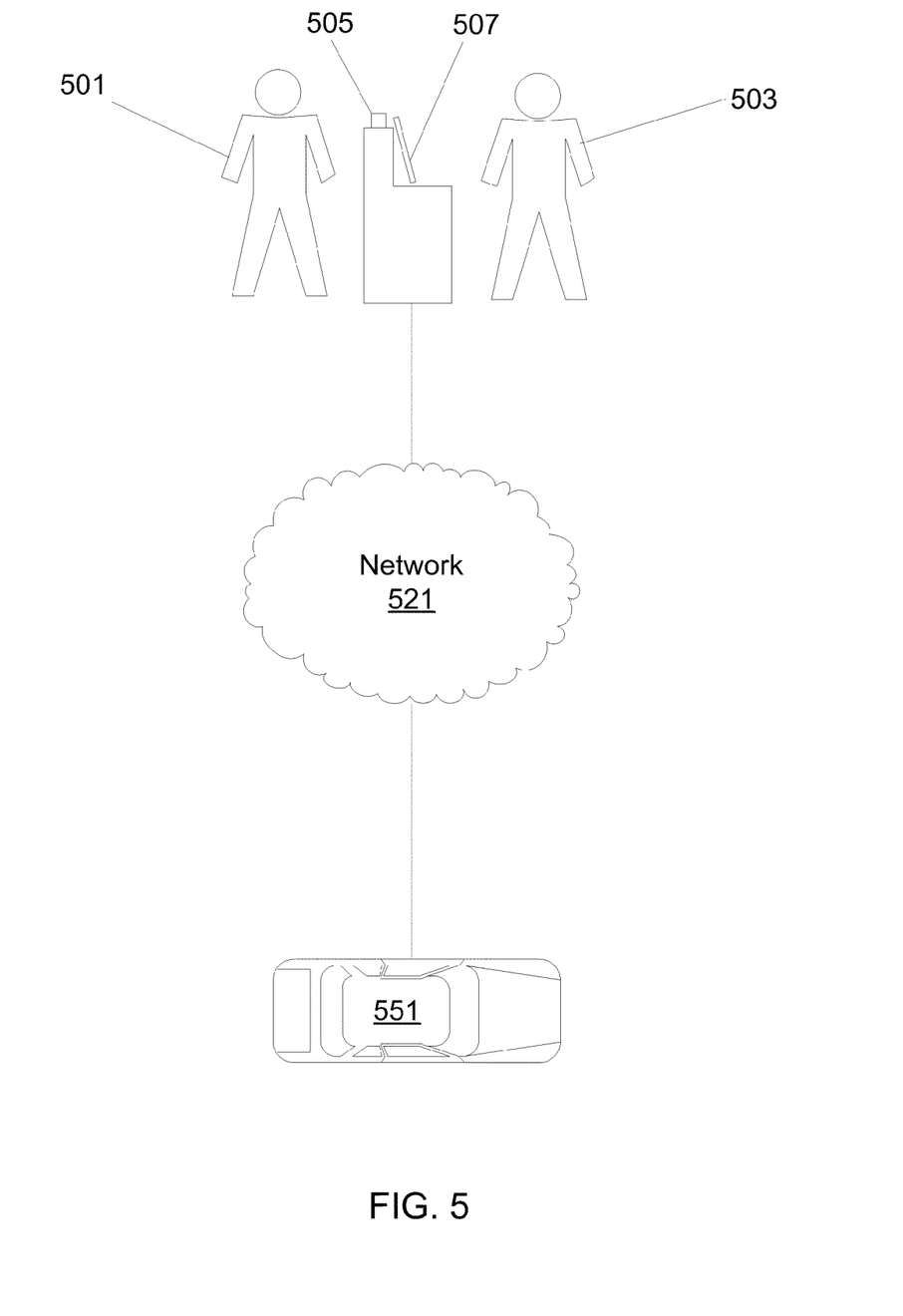
FIG. 5 is an illustrative schematic diagram of an environmental adjustment system using biometrics in accordance with at least one aspect of the present disclosure.

FIG. 5 is another illustrative schematic diagram of an environmental adjustment system using biometrics in accordance with at least one aspect of the present disclosure. FIG. 5 illustrates one example application of an environmental adjustment system. A customer 501 is shown to approach a service counter of a company, such as a car rental entity. A worker 503 may be stationed at the counter. After approaching or as approaching the counter, a biometric parameter of the customer 501 may be scanned by a biometric scanner 505 at the service counter. As should be understood, biometric scanner 505 may be physically positioned at a different location, such as at an entry door, and that the illustrative example herein is but one example use. In this example, biometric scanner 505 may be configured to scan a biometric parameter, such as a retina, of the customer 501 for identification purposes.

The scanned retinal image of the customer 501 may be sent to a computer terminal 507 utilized by the worker 503. In this example, the computer terminal 507 and/or one or more other local and/or external computers may determine whether the scanned retinal image of the customer 501 matches a stored retinal image of a plurality of stored retinal images. In this example, customer 501 was a previous customer and biometric parameters, such as a retinal scan, of the customer 501 were previously performed and the biometric parameters were stored in a database associated with the computer terminal 507. As such, computer terminal 507 may find a match between the scanned retinal image by the biometric scanner 505 and the previously stored retinal image in the database. Based upon the match, the customer 501 may be identified.

With the customer 501 identified, worker 503 may be presented with account information of the customer 501 at the computer terminal 505 before the customer 501 has even given a name. Worker 503 may greet the customer 501 and see if a reservation is already in place. In an example that a reservation for a particular car 551 is already present, computer terminal 507 and/or one or more other local and/or external computers may determine at least one physical adjustment to change on at least one device, in this example, a rental car 551. The rental car is configured for modifying an environmental condition of the customer 501. An environmental condition may be setting pre-set stations on the radio of the car 551, adjusting the driver's chair of the car 551, adjusting the review mirror of the car 551, automatically rolling down the windows of the car 551, and/or any of a number of other adjustments to modify an environmental condition associated with the car 551. A plurality of different adjustments may be made as well.

Customer 501 preferred environmental conditions may be maintained in a database associated with the computer terminal 507. The same database that maintains stored biometric parameters with customer identification may include such customer preferences. As such, once the customer 501 has been identified, the customer preferences for pre-set radio stations on the radio may be accessed and data representative of changing the pre-set stations to the preferred stations may be sent as an instruction to the rental car 551. As shown in the example of FIG. 5, communication between computer terminal 507 and rental car 551 is through at least one network 521. Communication between computer terminal 507 and rental car 551 may be wireless communication, wired communication, and/or a combination of the two communications.

In an example that a reservation for a particular car 551 is not present, a standard manner for making a reservation with the worker 503 may be made by the customer 501. Once a particular type of car for the car rental is identified, in this example, rental car 551, computer terminal 507 and/or one or more other local and/or external computers may determine at least one physical adjustment to change on at least one device, in this example, the rental car 551. The manner of sending signals and making changes may be implemented in the same or similar manner as described above.

In still another example, a customer 501 need not even access a service counter. If the customer 501 has a previous reservation for a particular type of vehicle present, customer 501 need only walk to the vehicle 551. In such a situation, a biometric parameter of the customer 501 may be scanned. A biometric scanner at the vehicle 551 and/or en route to the vehicle may actively or passively scan a retina of the customer 501. In an active situation, customer 501 may be required to look at a particular point for a camera of the biometric scanner to actively capture the retinal image of the customer 501. In a passive situation, customer 501 may simply walk toward the vehicle and a camera of the biometric scanner may passively capture the retinal image of the customer 501. In either situation, with the retinal image of the customer captured, a biometric measurement system within and/or associated with the vehicle 551 may determine whether the scanned retinal image of the customer 501 matches a stored retinal image of a plurality of stored retinal image and identify the customer 501 based upon the stored retinal image. Having identified the customer 501 specifically, customer preferences for environmental conditions of the vehicle 551 may be determined and made. In one example, all of the windows of the vehicle 551 may be lowered as customer 501 may have previously entered a preference for all windows lowered on days in which the outside temperature is above 80° F. and/or on days in which it is not raining. As such, environmental conditions of the vehicle 551 may be adjusted specifically for the customer 501 without the customer 501 having to manually perform any such adjustments.

Any of a number of different environmental conditions of a device may be changed based upon identification of preferences of an identified individual. One preference may be for a specific temperature level, such as when in a rental car or entering a conference room. The device may be an air conditioning system and the temperature of the rental car may be lowered in response to the preference of the identified individual. Another preference may be for a specific height level of the device. The device may be a podium and the height of the podium may automatically change based upon the preference of the identified individual. The individual may have a preference stored of placing a podium height level for resting the individual's arms at 5 feet above ground as that may be a desired height level of the individual to be comfortable behind a podium.

In addition, stored preferences of an individual may be one or more preferences previously determined by the individual and one or more preferences previously determined by another individual. In the example of a worker behind a service counter, one stored preference of an identified individual may be a first preference determined by the identified individual and another of the stored preferences of the identified individual may be a second preference determined by a different individual. The customer may be very tall and has a preference previously entered of lowering a platform beneath the customer so the customer is positioned better at the service counter for accessing a debit card scanner and/or keypad device. Concurrently, the worker may have previously stored a preference under this customer for raising her chair to have a better line of sight with the customer. In such a situation, one or more processes may be performed to ensure the two preferences do not conflict with a desired goal. For example, if the customer enters with a broken leg and is temporarily confined to a wheelchair, the first preference determined by the customer may still be implemented while the second preference determined by the worker may not be implemented to account for the temporary use of the wheelchair by the customer. These and other examples and illustrative applications may be utilized for one or more aspects of the present disclosure described herein.

While illustrative systems and methods as described herein embodying various aspects of the present disclosure are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present disclosure. The description is thus to be regarded as illustrative instead of restrictive on the present invention.

What is claimed is:

1. A method comprising:
   receiving a scanned biometric parameter of a customer
   determining whether the scanned biometric parameter of the customer matches a stored biometric parameter of a plurality of stored biometric parameters;
   identifying the customer based upon the stored biometric parameter;
   determining, based upon a plurality of stored preferences of the identified customer associated with the stored biometric parameter, at least one adjustment to change a physical attribute of a first device of the identified customer, and concurrently based on the stored preferences of the customer matching a stored preference of at least one worker, determining at least one adjustment to change a physical attribute of a second device of the at least one worker; and transmitting at least one instruction to implement the determined at least one adjustment to change on the first device, and at least one instruction to implement the determined at least one adjustment to change on the second device.

2. The method of claim 1, further comprising scanning the biometric parameter of the customer.

3. The method of claim 1, wherein determining, based upon the identified customer, the at least one adjustment to change on the first device includes:
 accessing a database of stored preferences of a plurality of customers;
 determining at least one stored preference of the identified customer, wherein the at least one stored preference modifies the physical attribute of the identified customer.

4. The method of claim 3, wherein the at least one stored preference of the identified customer is a height adjustment.

5. The method of claim 3, wherein the at least one stored preference of the identified customer is two preferences, a first preference modifies the physical attribute of the first device of the identified customer and a second preference modifies the physical attribute of the second device of the at least one worker.

6. The method of claim 1,
 wherein the at least one instruction to implement the determined at least one adjustment to change on the first device includes a plurality of instructions, each instruction of the plurality of instructions associated with a different device of the first device,
 wherein the at least one instruction to implement the determined at least one adjustment to change on the second device includes a second plurality of instructions, each instruction of the second plurality of instructions associated with a different device of the second device.

7. The method of claim 1, wherein the at least one adjustment of the first device or the second device are associated with spatial position.

8. One or more non-transitory computer-readable medium storing computer executable instructions that, when executed by at least one processor, cause the at least one processor to:
 receive a scanned biometric parameter of a customer;
 determine whether the scanned biometric parameter of the customer matches a stored biometric parameter of a plurality of stored biometric parameters;
 identify the customer based upon the stored biometric parameter;
 determine, based upon a plurality of stored preferences of the identified customer associated with the stored biometric parameter, at least one adjustment to change a physical attribute of a first device of the identified customer, and concurrently based on the stored preferences of the customer matching a stored preference of at least one worker, determine at least one adjustment to change a second device for the at least one worker; and
 transmit at least one instruction to implement the determined at least one adjustment to change on the first device, and at least one instruction to implement the determined at least one adjustment to change on the second device.

9. The non-transitory computer-readable medium of claim 8, computer instructions further comprising scanning the biometric parameter of the customer.

10. The non-transitory computer-readable medium of claim 8, wherein determine, based on the identified customer, the at least one adjustment to change on the first device includes:
 access a database of stored preferences of a plurality of customers;
 determine at least one stored preference of the identified customer, wherein the at least one stored preference modifies the physical attributes of the identified customer.

11. The non-transitory computer-readable medium of claim 10, wherein the at least one stored preference is two preferences, a first preference for modifying the physical attributes of the identified customer and a second preference for modifying the physical attributes of the at least one worker.

12. The non-transitory computer-readable medium of claim 8:
 wherein the at least one instruction to implement the determined at least one adjustment to change on the first device includes a plurality of instructions, each instruction of the plurality of instructions associated with a different device of the first device,
 wherein the at least one instruction to implement the determined at least one adjustment to change on the second device includes a second plurality of instructions, each instruction of the second plurality of instructions associated with a different device of the second device.

13. The non-transitory computer-readable medium of claim 8, wherein the at least one adjustment of the first device or the second device are associated with spatial position.

* * * * *